June 16, 1931.  V. LINK  1,809,982
VEHICLE BRAKE
Filed Jan. 10, 1927  2 Sheets-Sheet 1
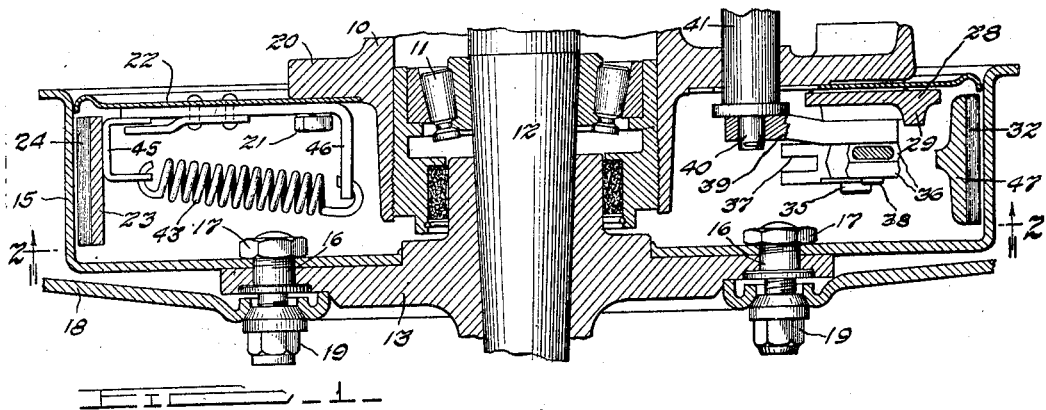
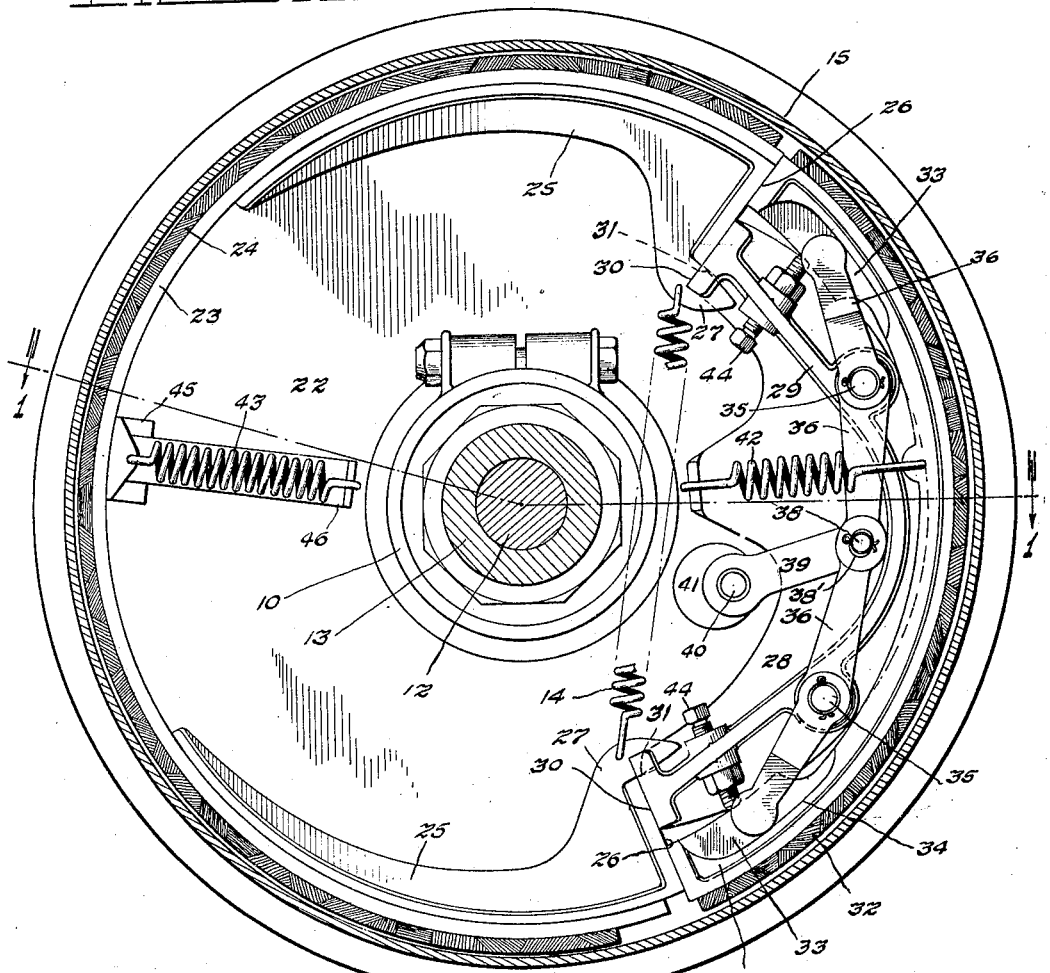
INVENTOR
Vincent Link
BY
P. W. Pomeroy
ATTORNEY June 16, 1931.    V. LINK    1,809,982
VEHICLE BRAKE
Filed Jan. 10, 1927    2 Sheets-Sheet 2
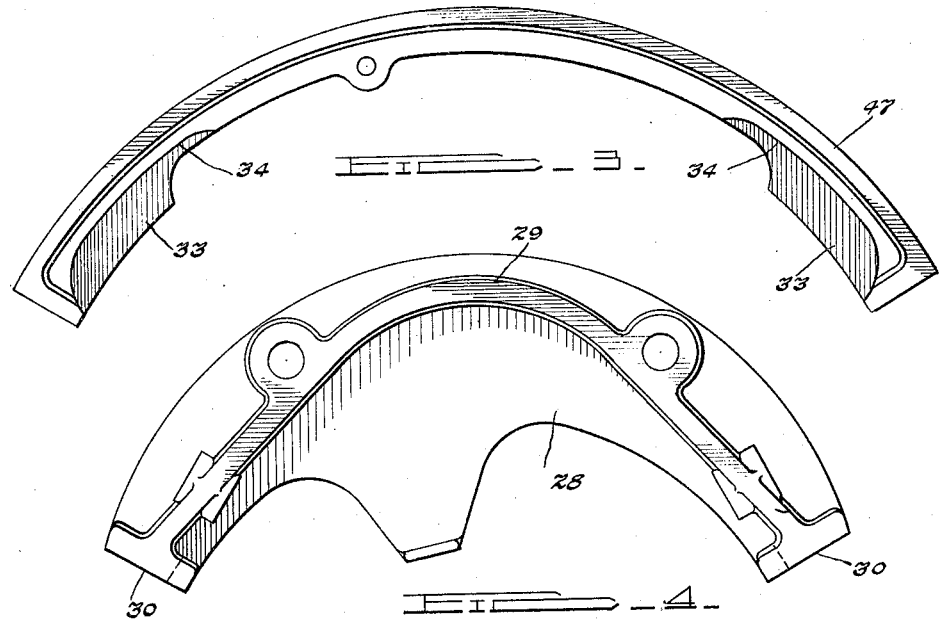
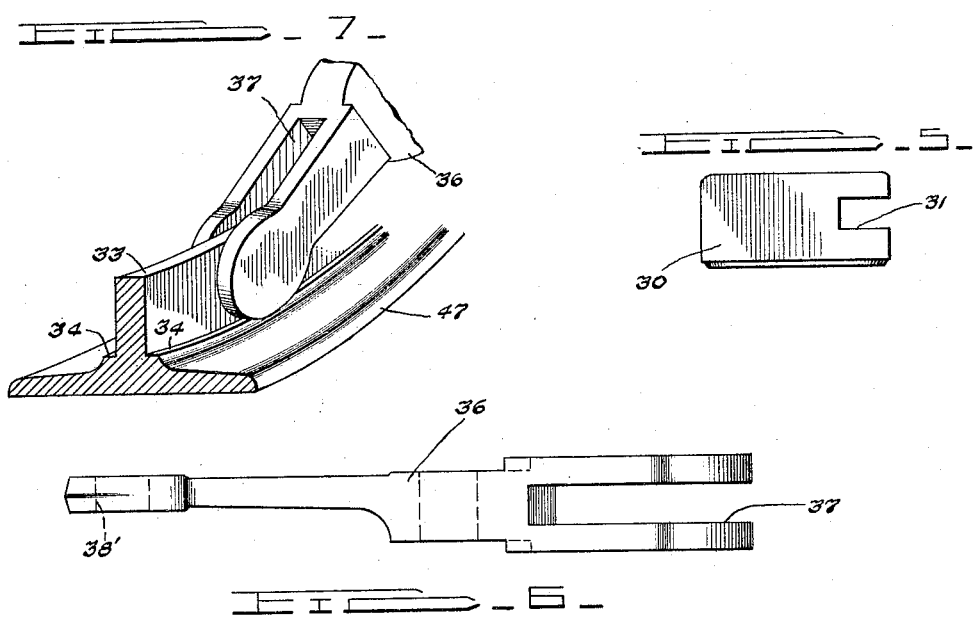
INVENTOR
Vincent Link
BY
P. W. Pomeroy
ATTORNEY Patented June 16, 1931

1,809,982

UNITED STATES PATENT OFFICE

VINCENT LINK, OF DETROIT, MICHIGAN, ASSIGNOR TO THE STUDEBAKER CORPORATION, OF SOUTH BEND, INDIANA, A CORPORATION OF NEW JERSEY

VEHICLE BRAKE

Application filed January 10, 1927. Serial No. 160,118.

This invention relates to brakes for vehicles and the like and has for its object the providing of a brake which will utilize the movement of the vehicle for applying the same, and a brake which will require but little effort on the part of the operator to cause the same to be applied, and which will need substantially no adjustment to compensate for wear.

Another object is to provide a brake comprising a drum provided with a noncontinuous band therein, a stop being provided for preventing bodily rotation of the band within the drum, a friction shoe being positioned between the free ends of the band and being movable by the operator of the brake radially of said drum into contact therewith, and being capable upon contact with said drum of movement circumferentially thereto, whereby it will be carried into contact with one of the ends of said band and will thereby cause said band to be expanded into contact with the drum.

Another object is to provide a brake comprising a drum enclosing a noncontinuous band, a stop being provided for limiting the movement of the free ends of said band in one direction, a radially and circumferentially movable friction shoe being positioned between the ends of said band and normally out of contact with the drum, manually operable means being provided for slidably engaging said friction shoe whereby said shoe may be caused to move into contact with said drum whereby it will be carried into contact with an end of said band upon rotation of said drum and thereby cause said band to be expanded into contact with the drum.

Another object is to provide a brake comprising a drum enclosing a noncontinuous band therein, the ends of the band normally contacting against and being slidably guided by a stop member, a radially and circumferentially movable friction shoe being provided between the free ends of said band and between said stop member and said brake drum and normally out of contact with said drum, manually operable means slidably engaging said brake shoe to guide the same and cause it to be moved at will into contact with said drum.

A further object is to provide a brake wherein such a degree of clearance between the brake shoe or band and the drum is possible and feasible that there is no danger of the shoe or band dragging when the brake is in inoperative position, which will require practically no attention to keep the same in working order, and which will particularly lend itself to be used on vehicles wherein all the brakes are adapted to be applied, and which will be simple in construction, economical to manufacture, and effective in operation.

The above being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Figure 1 is a fragmentary horizontal section taken through the center of a vehicle axle and wheel having a brake embodying the present invention in connection therewith, said section being taken on a line corresponding to the line 1—1 of Figure 2.

Figure 2 is a side view of the mechanism of Figure 1 taken on the line 2—2 of Figure 1, the brake drum being shown in section.

Figure 3 is an enlarged side view of the brake shoe shown in connection with the previous view.

Figure 4 is an enlarged side view of the stop member shown in connection with Figures 1 and 2.

Figure 5 is an end view of one of the end faces of the stop member shown in Figure 4.

Figure 6 is an enlarged plan view of one of the double armed levers shown in Figure 2 and employed for moving the brake shoe into contact with the brake drum.

Figure 7 is a fragmentary perspective view showing the manner in which the lever shown in Figure 6 operatively engages the brake shoe shown in Figure 3.

Referring to the drawings and particularly to Figures 1 and 2, it will be seen that the end of the axle housing 10 is provided interiorly thereof with a bearing 11 for supporting the tapered end of the axle shaft 12. A flange member 13 is secured to the extreme end of the axle 12 by means of a conventional nut (not shown). A brake drum 15 is secured to the inner face of the flange member 13 concentrically with the axle 12 by means of studs 16 and nuts 17, a wheel 18, shown as a disc wheel in the particular embodiment, being secured to the outer face of the flange member 13 concentrically with the axle 12 by means of the same studs 16, and nuts 19. Adjacent the outer end of the axle housing 10 is formed a radially disposed flange 20, to the inner face of which is secured, by screws 21, a dust cover 22 which serves to close the open end of the drum 15 and prevent the entrance of dust thereinto.

Positioned within the drum 15 and extending substantially two-thirds of the circumference thereof, and normally out of contact therewith, is a brake band 23 faced by suitable friction material 24. To each free end of the brake band 23 is secured a bracket 25 which extends a substantial length along the band 23 and which terminates adjacent to each free end thereof in a radially disposed flat face 26, a circumferentially extending relatively narrow tongue 27 projecting from the inner edge of each face 26 toward the opposite end of the brake band 23 for a purpose to be described hereafter. Positioned within the brake drum 15 between the free ends of the brake band 23 and secured to the dust cover 22 by suitable means is a stop member comprising a flat attaching face or web 28, a transverse strengthening web 29, and end faces 30 against which the flat radial faces 26 of the brake band brackets 25 normally rest. As indicated in Figure 5, the flat end faces 30 of the stop member are each provided with a slot 31 which slidably receives the adjacent tongue 27 on the end of the adjacent brake band bracket 25, and thereby restrains the same from movement transversely to the brake drum 15 and thus holds the brake band 23 centrally within the drum 15.

The outer edges of the tongues 27, which contact against the bottoms of the slots 31, do not lie in the path of a circle with the center of the shaft 12 as a center, but are slightly cam-shaped with the free end portion thereof at a closer distance to the center of the shaft 12 than that portion immediately adjacent to the face 26, the radial distance from this last portion to the outer face of the friction material 24 being slightly less than the radial distance from the bottom surface of the slots 31 to the inside face of the drum 15, so that when one of the faces 26 is in contact with its co-operating face 30, the co-operating tongue 27, working in the slot 31, will raise that end of the band 23 out of contact with the drum 15. The shape of the tongue 27 is such that when one of the end faces 26 moves away from its co-operating face 30, the co-operating end of the band 23 will be allowed to move into contact with the drum 15. A coil spring 14, extending between the ends of the brackets 25, normally holds the co-acting faces 26 and 30 in contact with each other and consequently holds the free ends of the band 23 out of contact with the drum 15. A coil spring 43, extending between the bracket 45 secured to the band 23 between its ends, and the bracket 46 secured to the dust cover 22, serves to normally hold the remainder of the band 23 out of contact with the drum 15.

Positioned between the free ends of the band 23 and between the stop member and the drum 15, is a brake shoe 47 (see Figure 3) suitably faced by friction material 32 and of a length corresponding radially with the length of the stop member, so that its end portions normally rest against both brake band brackets 25 when the faces 26 of the latter are in contact with both faces 30 of the stop member. The shoe 47 has formed adjacent to its ends a central radial rib 33 terminating adjacent to the face of the shoe 47 in a circumferential track 34 best shown in Figure 7.

Pivotally supported on pins 35 carried by the stop member and equally positioned on either side of the center line thereof are levers 36 the adjacent ends of which are arranged in overlapping relation with each other and the outer ends of which are slotted as at 37 to straddle the rib 33 on the ends of the shoe 47 and bear against the track 34. The slotted ends 37 of the levers 36, in embracing the radial ribs 33 serve to hold the shoe 47 centrally with respect to the drum 15 and prevent lateral displacement thereof. The overlapping adjacent ends of the lever 36 are each provided with an elongated slot 38' which receives a pin 38 carried by the outer end of the link 39. The inner end of the link 39 pivotally engages the pin 40 which is formed eccentrically on the outer end of the brake shaft 41.

The operation of the shoe 47 will now be readily apparent. When the shaft 41 is rotated by any conventional means, the eccentric pin 40 draws the link 39 inwardly toward the axle 12. When the end of the link 39 is thus drawn in toward the axle 12 the overlapping adjacent ends of the levers 36 are likewise moved inwardly, the levers 36 pivoting about the pins 35 and causing the outer ends of the levers 36 to move outwardly. In moving outwardly the outer ends of the levers 36 abut against the tracks 34 on the shoe 47 and move the entire shoe bodily outwardly until the same contacts with the inner surface of the drum 15. If the brake drum 15 is rotating when the shoe 47 comes in contact therewith the friction between the shoe 47 and the brake band 15 tends to cause the shoe 31 to rotate therewith. If the shoe 47 is moved into contact with the drum 15 with sufficient force, the tendency of the shoe 47 to rotate therewith is transmitted to the adjacent brake band bracket 25 in the direction of rotation of the drum, and forces such brake band bracket away from the face 30 of the stop member and thereby expands the brake band 23 into contact with the drum 15 after which the friction between the brake band 23 and the drum 15 tends to cause a further movement and frictional engagement between the brake band 23 and brake drum 15. The opposite end of the brake band being in contact with the face 30 of the stop member is prevented from moving and consequently the brake band 23 cannot move bodily around with the drum 15. As soon as the shaft 41 is rotated back to normal position, the spring 42 draws the shoe 47 out of contact with the drum 15 and back to normal inoperative position, and the expanding pressure caused by the shoe 47 against the end of the brake band 23 upon being released, the springs 14 and 43 draw the brake band 23 out of contact with the drum 15 in the manner previously described.

Suitable set screws such as 44 are preferably provided in the web 29 of the stop member for limiting the amount which the shoe 47 may be drawn out of contact with the drum 15, the outer ends thereof abutting against the radial ribs 33 of the shoe 47 and thereby adjustably controlling the radial position thereof.

It will be apparent that in the present invention the brake will work equally well when the drum 15 is turning in one direction as when it is turning in the opposite direction. It will also be apparent that the only pressure necessary to be exerted to apply the brakes is the pressure necessary to move the shoe 47 into contact with the drum 15, the movement of the vehicle itself thereafter supplying the energy necessary to expand the band 23 into contact with the drum 15 and thereby cause a retarding effect on the drum. This materially reduces the pressure which must be applied to the brake pedal when such brake is used on a vehicle, in order to slow down or stop the vehicle, in comparison to vehicles wherein the pedal pressure must expand the entire brake band. In other words this construction is of the "servo" type in which the movement of the vehicle acts to apply its own brakes.

The brake in the drawings is what is known as the wrapping band type. That is, the band tends to wrap itself against the drum when applied to contact therewith. Such a construction is very effective in applying brakes, but care must be exercised to prevent grabbing of the drum by the band. In the present invention, I am able to control this feature by two different means. The first is by increasing or decreasing the length of the brake band 23 and the shoe 24 a corresponding amount, and the other is by increasing or decreasing the length of the brake band brackets 25 to add or subtract flexibility to or from the band 23.

In the prevailing type of brakes used at the present time it is necessary to have a clearance between the brake drum and the brake band or shoe relatively small in order that a practical amount of pedal movement may be used and at the same time enough pressure be exerted to properly apply the brakes. This necessitates such a small clearance in fact, that it is a common occurrence in brakes of the band type that the brake band drags on the drum when the brake is in inoperative position. Inasmuch as in the brake shown in the drawings, the only movement and pressure necessary to apply the brakes is that necessary to move the shoe 47 into contact with the drum 15, the brake band 23 may be spaced at a relatively large distance from the drum 15 when in inoperative position, as the movement of the shoe 47 with the drum 15 will easily and effectively expand the brake band 23 with relatively little movement of the brake shaft 41. Moreover, as the brake shoe 47 does not materially brake the drum, its friction facing 32 is not subject to the degree of wear to which the friction facing 24 of the band 23 is subjected and therefore requires little adjustment, if any, which may be taken care of either in the brake rod connection or at the pedal.

The feature of requiring but little pressure to effectively apply the brake makes it especially adaptable for use in connection with vehicles in which there are brakes on all of the wheels. In the usual mechanical four-wheel brakes now on the market the pressure which must be applied to the brake pedal is invariably excessive, especially on larger vehicles, and the present construction when applied on all four wheels of the vehicle will provide a braking system with a much more rational pedal pressure than is found in conventional constructions. Inasmuch as this construction constitutes a "servo" or self-applying brake, self-contained, it does not need the gearing, drum, and connections usually associated with "servo" brakes.

Although in the accompanying drawings and descriptions I have shown and described this device as a brake for a vehicle, it is evident that the same may be adapted for use in other places with equally good results, and formal changes may be made in the specific embodiment of the invention described without departing from the spirit and substance of the broad invention, the scope of which is commensurate with the appended claims.

What I claim is:—

1. The combination with a stationary part and a rotatable member having a drum with a cylindrical surface thereon, of a noncontinuous friction member positioned adjacent to said cylindrical surface and normally out of contact therewith, a second friction member positioned between the free ends of the first-mentioned friction member, fixed stops normally engaging the ends of the first-mentioned friction member, and means slidably engaging said second friction member for moving it into contact with said cylindrical surface to be carried thereby into contact with said first-mentioned friction member and cause the same to engage said drum.

2. In combination with a brake drum, a noncontinuous friction member positioned therein normally out of contact with said drum, a second friction member positioned within said drum between and normally engaging the ends of the first-mentioned friction member, and a pair of co-acting levers slidably engaging the end portions of said second friction member for moving the same into contact with said drum whereby said second friction member will be carried around thereby and cause said first-mentioned friction member to engage said drum.

3. In combination with a brake drum, a noncontinuous friction member positioned therein normally out of contact with said drum, a stop member positioned between the ends of said friction member for limiting circumferential movement thereof, and means on the free ends of said friction member slidably engaging said stop member for preventing lateral displacement of said friction member.

4. In combination with a brake drum, a noncontinuous friction member positioned therein and normally out of contact therewith, a stop member positioned between the free ends of said friction member, slots in said stop member, and ears on said friction member slidably engaging said slots to prevent displacement of said friction member axially of said drum.

5. In combination with a brake drum, a noncontinuous friction member positioned therein and normally spaced from the walls thereof, a stop member positioned between the free ends of said friction member, both free ends of said friction member engaging said stop member when said friction member is in inoperative position, and co-operating means between said friction member and said stop member whereby when said ends of said friction member are in contact with said stop member said ends are lifted out of engagement with said drum.

6. In combination with a brake drum, a noncontinuous friction member positioned therein, a stop member positioned between the free ends of said friction member, contact members carried by the free ends of said friction member, and a co-acting cam surface between the free ends of said friction member and said stop member whereby when either of said contact faces is in contact with said stop member the corresponding end of said friction member is prevented from coming into contact with said brake drum.

7. In combination with a brake drum, a noncontinuous friction member positioned therein, contact members on the free ends of said friction member, a stop member positioned between the free ends of said friction member and normally in contact with said contact members, and a co-acting cam surface between the free ends of said friction member and said stop member whereby when either of said contact faces is in contact with said stop member the corresponding end of said friction member is prevented from coming into contact with said brake drum and when said friction member is moved out of contact with said stop member the same is permitted to engage said drum.

8. In combination with a brake drum, a noncontinuous friction member positioned therein, a stationary stop member positioned between the free ends of said friction member, a pair of pivotal levers carried by said stop member, a second friction member positioned between the free ends of the first-mentioned friction member, a track on said second friction member slidably engaged by the ends of said levers, and means for moving said levers to force said second member into contact with said drum, whereby said second member will be caused to move with said drum and force said first-mentioned friction member into contact with said drum.

9. In combination with a rotatable brake drum, a noncontinuous friction member positioned therein, a stationary stop member positioned between the free ends of said friction member, a pivotal lever carried by said stop member provided with a bifurcated end, a second friction member positioned between the free ends of the first-mentioned friction member and normally held out of contact with said drum, said second friction member being provided with a radial rib received within the bifurcated end of said lever, a track on said second friction member slidably engaged by said bifurcated end, and means for controlling the pivotal position of said lever to force said second-mentioned friction member into contact with said drum, whereby said second friction member will be carried by said drum into contact with said first-mentioned friction member and cause the same to be expanded into contact with said drum.

Signed by me at Detroit, Michigan, this 3rd day of Jan., 1927.

VINCENT LINK.